(12) United States Patent
Ekkizogloy et al.

(10) Patent No.: US 7,509,050 B2
(45) Date of Patent: Mar. 24, 2009

(54) MICROCODE-DRIVEN SELF-CALIBRATION OF OPTICAL TRANSCEIVERS TO ENVIRONMENTAL CONDITIONS

(75) Inventors: Luke M. Ekkizogloy, San Jose, CA (US); Gerald L. Dybsetter, Scotts Valley, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 164 days.

(21) Appl. No.: 10/882,447

(22) Filed: Jun. 30, 2004

(65) Prior Publication Data

US 2006/0002707 A1 Jan. 5, 2006

(51) Int. Cl.
*H04B 10/00* (2006.01)

(52) U.S. Cl. .................... 398/135; 398/136; 398/138

(58) Field of Classification Search .......... 398/135–139
See application file for complete search history.

(56) References Cited

U.S. PATENT DOCUMENTS

| | | | |
|---|---|---|---|
| 4,784,454 A | 11/1988 | Dyott | |
| 4,903,262 A * | 2/1990 | Dissosway et al. | 370/327 |
| 5,035,481 A | 7/1991 | Mollenauer | |
| 5,144,632 A | 9/1992 | Thonn | |
| 5,812,572 A | 9/1998 | King et al. | |
| 6,400,737 B1 | 6/2002 | Broutin et al. | |
| 6,512,617 B1 * | 1/2003 | Tanji et al. | 398/137 |
| 6,590,644 B1 | 7/2003 | Coin et al. | |
| 6,618,425 B1 | 9/2003 | Carlesi et al. | |
| 6,898,702 B1 | 5/2005 | Evans | |
| 2002/0027688 A1 * | 3/2002 | Stephenson | 359/152 |
| 2002/0078403 A1 | 6/2002 | Gullo et al. | |
| 2002/0097468 A1 | 7/2002 | Mecherle et al. | |
| 2002/0143920 A1 | 10/2002 | Dev et al. | |
| 2003/0223756 A1 * | 12/2003 | Tatum et al. | 398/135 |
| 2004/0022537 A1 * | 2/2004 | Mecherle et al. | 398/41 |
| 2004/0022543 A1 | 2/2004 | Hosking | |
| 2004/0033079 A1 * | 2/2004 | Sheth et al. | 398/135 |
| 2004/0057730 A1 | 3/2004 | Littlejohn et al. | |
| 2004/0136719 A1 * | 7/2004 | Hidai et al. | 398/135 |
| 2005/0017751 A1 * | 1/2005 | Gunn et al. | 324/771 |
| 2005/0105915 A1 | 5/2005 | Light | |
| 2005/0111845 A1 * | 5/2005 | Nelson et al. | 398/138 |
| 2006/0034612 A1 | 2/2006 | Yu et al. | |
| 2006/0098699 A1 * | 5/2006 | Sanchez | 372/26 |

OTHER PUBLICATIONS

U.S. Appl. No. 10/883,208, filed Jun. 30, 2004, Jayne C. Hahin, et al.
U.S. Appl. No. 10/883,209, filed Jun. 30, 2004, Gerald L. Dybsetter, et al.

* cited by examiner

*Primary Examiner*—Dalzid Singh
(74) *Attorney, Agent, or Firm*—Workman Nydegger

(57) ABSTRACT

An optical transceiver (or transmitter or receiver) that uses microcode and an internal sensor to self-calibrate itself to an environmental parameter such as, for example, temperature. In particular, the optical transceiver senses the environmental parameter under changing environmental circumstances. The optical transceiver then calculates how an operational parameter such as laser bias current should change based on the sensing operation. The optical transceiver then persistently records an approximation of the relation between the environmental parameter and the operational parameter. This approximation may later be used during operation to adjust the operational parameter as appropriate given then-existing environmental circumstances.

39 Claims, 2 Drawing Sheets

MICROCODE-DRIVEN SELF-CALIBRATION OF OPTICAL TRANSCEIVERS TO ENVIRONMENTAL CONDITIONS

BACKGROUND OF THE INVENTION

1. The Field of the Invention

The present invention relates generally to optical transceivers. More specifically, the present invention relates to optical transceivers that use microcode to perform self-calibration to environmental conditions.

2. Background and Relevant Art

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to amplify the channel-attenuated received signal prior to further processing. A controller circuit (hereinafter referred to the "controller") controls the operation of the laser driver and post-amplifier.

The operation of optical transceiver is susceptible to its operating environment. For example, temperature can change the operating characteristics of the optical transmitter itself. In particular, the wavelength output of a laser may drift from approximately 0.3 nanometers (nm) to approximately 0.6 nm for every one degree Celsius change in temperature. Since lasers generate heat during operation, this can have a significant effect upon the operation of the laser. Wavelength variations can cause crosstalk, where one transmission becomes confused with another. Furthermore, varying wavelengths due to varying laser temperature may cause different fiber attenuations. Accordingly, temperature has great influence over the proper operation of the optical transceiver.

Some high performance optical transceivers include a Thermo Electric Cooler (TEC) which cools or heats the optical transceiver as appropriate to counteract the heating or cooling effect of the surrounding environment. However, even with such countermeasures, there is still some variance in temperature of the laser itself. In order to further improve the performance of the laser, the laser bias current may be adjusted to further counteract the effects of temperature on the operating wavelength of the laser.

The transmitter itself (e.g., the laser) may have some uncertainty in its operating performance due to the inherent variances in semiconductor processing technologies. Even lasers of the same type having undergone the same manufacturing processes may have different temperature/laser bias current dependencies. Accordingly, it is often necessary for high performance and high speed applications, to individually calibrate each optical transceiver with a temperature/laser bias current table. The optical transceiver then refers to the table when deciding what laser bias current magnitude to bias the laser with given the current temperature.

This calibration can take significant amount of human effort, thereby increasing the cost of the optical transceiver as a whole. Therefore, what would be desired is an optical transceiver that calibrates without requiring excessive human intervention.

BRIEF SUMMARY OF THE INVENTION

The foregoing problems with the prior state of the art are overcome by the principles of the present invention, which relate to an optical transceiver that has at least one processor, a system memory, a sensor for sensing an environmental parameter, and a persistent memory. The persistent memory includes microcode that when loaded into system memory and executed by the processor(s), causes the optical transmitter to sense the environmental parameter. The optical transceiver then uses the sensed value to approximate how the operational parameter should change as a function of changes in the environmental parameter. This process may be repeated for a number of different environment conditions under which the value of the environmental parameter may be expected to change. The optical transceiver records a representation of the functional approximation between the operational parameter and the environmental parameter in the persistent memory. Later, during actual operation, the representation may be used to approximate the operational parameter appropriate for a given measured environmental parameter. Accordingly, the optical transceiver uses microcode to self-calibrate to an environmental parameter.

The environmental parameter may include, for example, temperature, supply voltage, humidity, acceleration, ambient light levels, ambient vibration, magnetic flux intensity, or others. The operational parameter may include laser bias current, TEC current, or other operational parameters that should change with the environmental parameter in order to maintain proper operation.

Accordingly, the principles of the present invention highly automate the calibration of the optical transceiver without requiring excessive human monitoring or external equipment. This reduces the overall cost of calibrating the optical transceiver. Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to an optical transceiver that uses microcode and an internal sensor to self-calibrate to an environmental parameter such as, for example, temperature. In particular, the optical transceiver senses the environmental parameter under changing environmental circumstances (e.g., in an oven). The optical transceiver then calculates how an operational parameter (such as laser bias current) should change based on the sensing operation. For example, the optical transceiver may adjust its transmit power until an appropriate level of transmit power is observed, and then record the corresponding operational parameter value needed to achieve that optical intensity given the current value of the environmental parameter. The optical transceiver then persistently records an approximation of the relation between the environmental parameter and the operational parameter. This process may be repeated for a wide range of possible values for the environmental parameter, and for a wide range of environmental parameters. This approximation may later be used during operation to adjust the operational parameter as appropriate given then-existing environmental circumstances.

Figure 1:
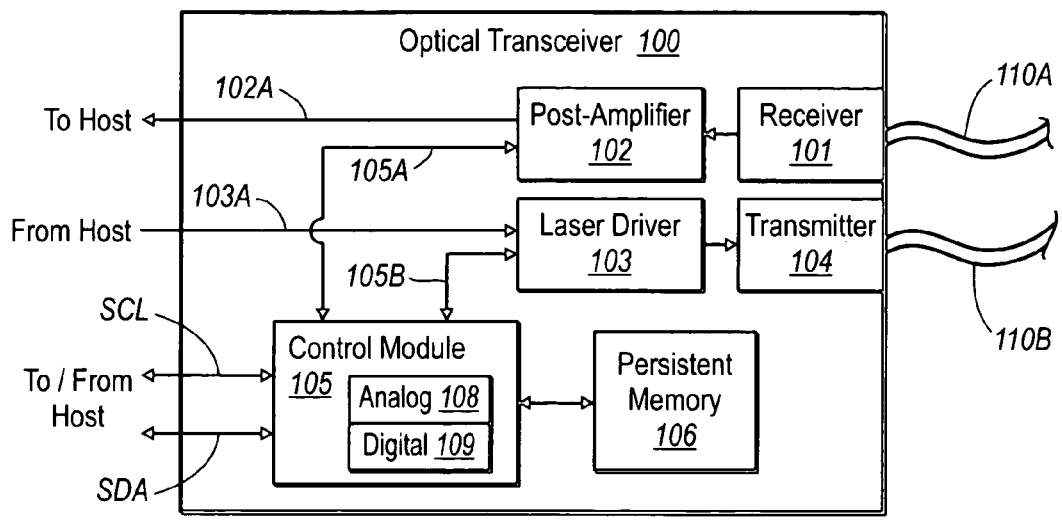
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention allow for suitable calibration of the optical transceiver 100 without requiring excessive human labor or time to monitor the calibration process. The principles of the present invention are suitable for 1G, 2G, 4G, 10G and higher bandwidth fiber optic links as sensitivity to operational circumstances increases. Furthermore, the principles of the present invention may be implemented in laser transmitter/receivers of any form factor such as XFP, SFP and SFF, without restriction.

The optical transceiver 100 receives an optical signal from fiber 110A using receiver 101. The receiver 101 acts as an optoelectric transducer by transforming the optical signal into an electrical signal. The receiver 101 provides the resulting electrical signal to a post-amplifier 102. The post-amplifier 102 amplifies the signal and provides the amplified signal to the host as represented by arrow 102A.

The optical transceiver 100 may also receive electrical signals from the host for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the laser transmitter/receiver 100 includes a control module 105, which evaluates temperature and voltage conditions and other operational circumstances, and receives information from the post-amplifier 102 (as represented by arrow 105A) and from the laser driver 103 (as represented by arrow 105B). This will allow the control module 105 to counteract the dynamically varying performance, and detect when there is a loss of signal. The control module 105, the post-amplifier 102, and the laser driver 103 may be other the same chip. Alternatively, they may be distributed across two or more chips regardless.

Specifically, the control module 105 may counteract these changes by adjusting settings on the post-amplifier 102 and/or the laser driver 103 as represented by the arrows 105A and 105B. These settings adjustments are quite intermittent since they are only made when temperature or voltage or other low frequency changes so warrant.

The control module 105 has access to a persistent memory 106, which in one embodiment, is an Electrically Erasable and Programmable Read Only Memory (EEPROM). The persistent memory 106 and the control module 105 may be packaged together in the same package or in different packages without restriction. Data and clock signals may be provided from the host to the control module 105 using the serial clock line SCL, and the serial data line SDA. Also data may be provided from the control module 105 to the host using serial data signal SDA to allow for digital diagnostics and readings of temperature levels, transmit/receiver power levels, and the like.

Figure 2:
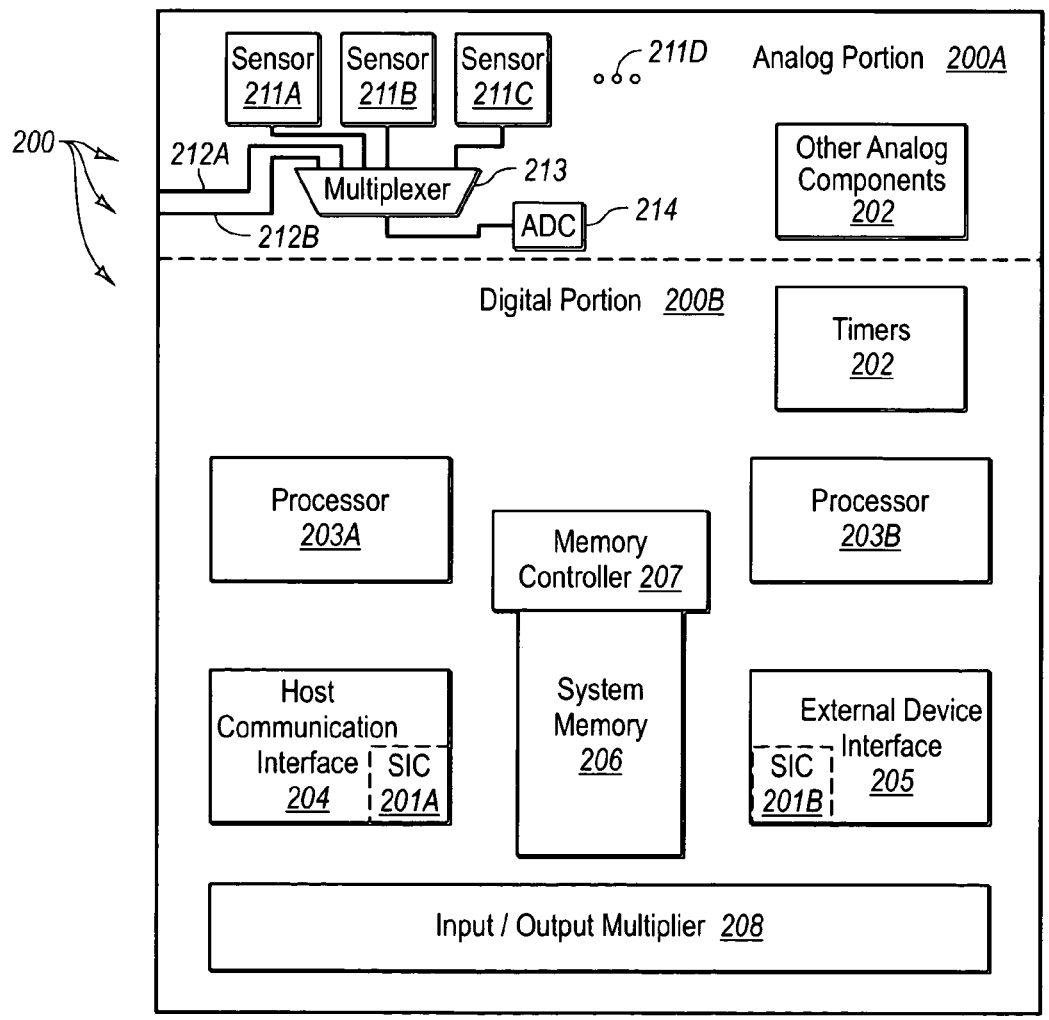
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, and analog to digital converters, high speed comparators (e.g., for event detection), voltage based reset generators, voltage regulators, voltage references, clock generator, and other analog components. For example, the analog portion includes sensors 211A, 211B, 211C amongst potentially others as represented by the horizontal ellipses 211D. Each of these sensors may be responsible for measuring environmental and/or operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each value may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components. The high speed comparators may be supplied with one input being from an internal sensor or from an external line to receive a measured parameter value. The other input to the comparator may be a comparison value. Should the measured parameter value exceed the comparison value, the comparator may generate a logical high (or low) which indicates that the event has occurred. For example, suppose that the standard maximum transceiver temperature is 85 degrees Celsius. The actual measured transceiver temperature may be provided as one input to a comparator, while a value representing 85 degrees Celsius is provided to the other input of the comparator.

The digital portion 200B of the control module 200 may include a timer module 202 that provides various timing signals used by the digital portion 200B. Such timing signals may include, for example, programmable processor times. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host using the serial clock line SCL and the serial data line SDA of the optical transceiver 100. The external device interface 105 is used to communicate with, for example, other modules within the optical transceiver 100 such as, for example, the post-amplifier 102, the laser driver 103, or the persistent memory 106.

The internal system memory 206 (not to be confused with the external persistent memory 106) may be Random Access Memory (RAM). The memory controller 207 shares access to the system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as $I^2C$ or may be another other serial interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the chip. Accordingly, there may be more input\output nodes within the control module 200 than there are pins available on the control module 200, thereby reducing the footprint of the control module 200.

Having described a specific environment with respect to FIGS. 1 and 2, it will be understood that this specific environment is only one of countless architectures in which the principles of the present invention may be employed. As previously stated, the principles of the present invention are not intended to be limited to any particular environment.

Figure 3:
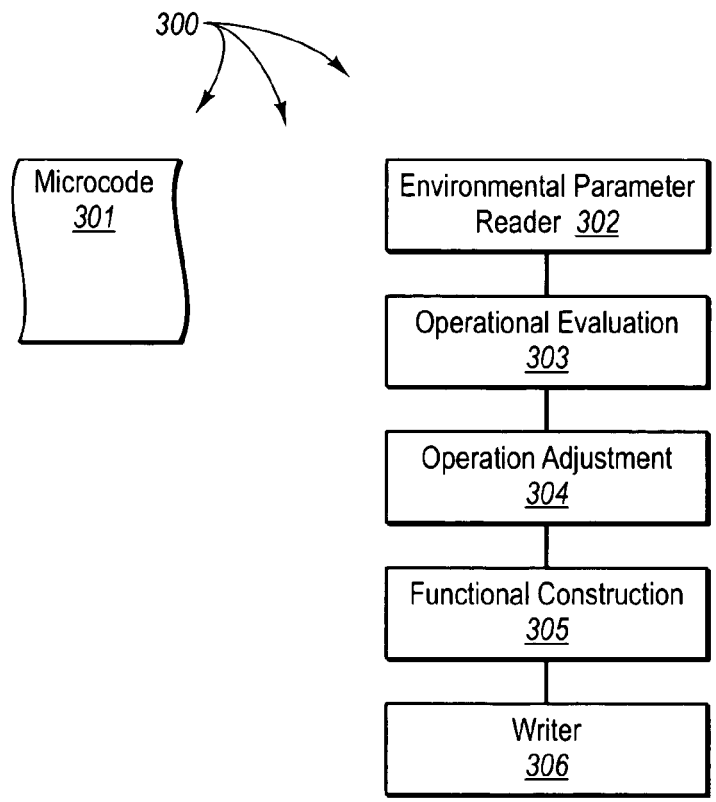
FIG. 3 illustrates a software architecture that may be maintained in system memory during run-time in accordance with the principles of the present invention.

FIG. 3 illustrates a software architecture 300 that may be instantiated in system memory 206. In particular, the processors 203 load microcode 301 into the system memory 206 from the persistent memory 106. The remainder of the software architecture 300 is either instantiated in system memory 206 upon the execution of the microcode 301, or else abstractly represents functionality implemented by the optical transceiver 100 upon the execution of the microcode 301. Alternatively, the microcode 301 may be directly executed from persistent memory. In that case, the microcode 301 is loaded into the system memory a fraction at a time (e.g., one instruction at a time) for execution by the processor. In this latter case, the system memory may be a register, flip-flops, or any other memory regardless of size or type.

Figure 4:
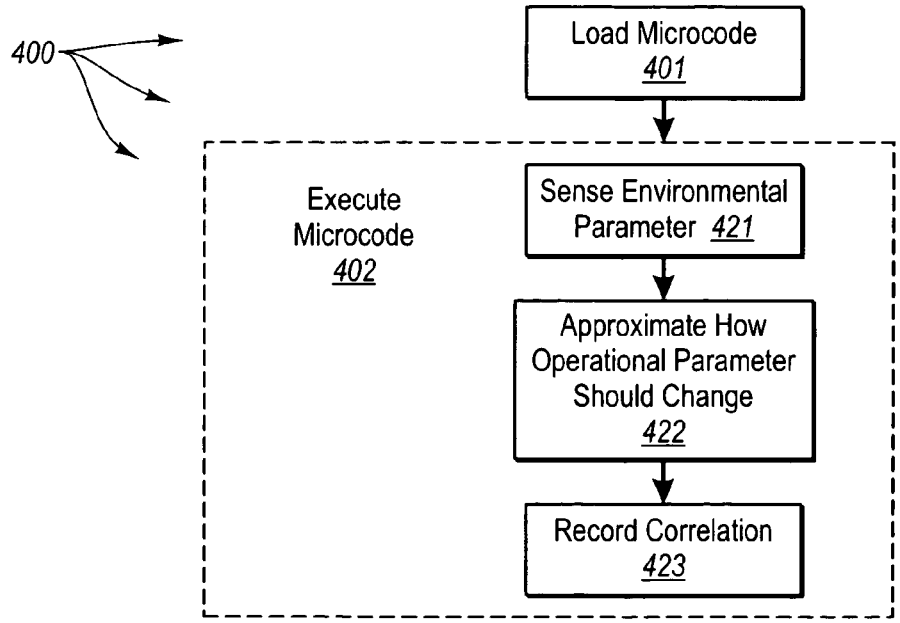
FIG. 4 illustrates a method for an optical transceiver to self-calibrate in accordance with the principles of the present invention.

The software architecture 300 includes an environmental parameter reader component 302, an operation evaluation component 303, an operation adjustment component 304, a functional construction component 305, and a writer component 306. The software architecture 300 of FIG. 3 will be described with reference to FIG. 4, which illustrates a flowchart of a method 400 for the optical transceiver to self-calibrate to an operational parameter.

First, the optical transceiver 100 loads the microcode 301 from persistent memory 106 to system memory 206 (act 401). If the persistent memory 106 is an $I^2C$ EEPROM, then this may be accomplished using the conventional $I^2C$ two-wire interface. However, for other persistent memories, other communication protocols may be used.

The processors 203 then execute the microcode (act 402). The microcode is structured such that the optical transceiver performs the acts illustrated within act 402 when executed. Specifically, the processors 203 sense the environmental parameter under environmental circumstances in which the environmental parameter changes (act 421), approximate how an operational parameter should change as a function of changes in the environmental parameter (act 422), and then record a representation of the functional approximation between the operational parameter and the environmental parameter in the persistent memory (act 423).

For example, suppose that the environmental parameter is temperature. In order to allow the optical transceiver 100 to self-calibrate, the optical transceiver 100 is placed in environmental circumstances in which the environmental parameter may be expected to change. For example, the optical transceiver may be placed in an oven which varies its temperature across the operation temperature range of the optical transceiver.

The optical transceiver 100 may then be powered on, causing the microcode 301 to be automatically loaded into system memory 206 and executed by the processors 203. In one embodiment, the microcode 301 includes special self-calibration microcode which is automatically executed upon powering on. This microcode may be replaced with other microcode or otherwise modified prior to shipping the optical transceiver 100 to a customer. Microcode may be placed in a persistent memory such as EEPROM using well-known programming techniques. For example, an EEPROM programming interface module may use the I²C two-wire interface to program the persistent memory 106 with the appropriate microcode.

The temperature may be sensed by, for example, one of the sensors 211. The environmental parameter reader component 302 may then cause the temperature reading to be accessible to the rest of the functional components in the software architecture 300. The microcode causes the optical transceiver to determine what the operational parameter should be given the environmental parameter value. For instance, the operational parameter may be the laser bias current, whose performance characteristically depends on temperature.

In order to determine what the operational parameter should be, the operation evaluation component 303 may evaluate one or more operational parameters of the optical transceiver 100. For instance, the operation evaluation component 303 may monitor transmit power, wavelength and the laser bias current. The operation adjustment component 304 then adjusts the operational parameter such the laser bias current unless the desired temperature compensation is achieved. For instance, the operation adjustment component 304 may adjust the laser bias current until the appropriate transmit power and/or wavelength is observed. At this point, the optical transceiver may identify the laser bias current that results in the optimal transmit power as corresponding to the measured temperature.

This process of identifying various values of an operational parameter that correspond to various values of an environmental parameter may be repeated for a full range of expected environmental parameter values. For instance, the microcode may be structured so that this process is repeated each time the appropriate temperature sensor detects a change in temperature (e.g., every one degree Celsius) as the environment spans the entire expected environmental parameter range (e.g., as the oven heats up). The result is a functional correlation between the operational parameter and the environmental parameter. The functional construction component 305 generates a representation of this correlation. This correlation may be expressed in terms of a table that compares environmental parameter values to appropriate operational parameter values, or may even be expressed as a functional approximation or formulaic relation (e.g., constant values for a linear or polynomial approximation) of the correlation. The writer component 306 then may record this correlation in the persistent memory 106 for later use during normal operation of the optical transceiver 100 after shipment to a customer.

In one embodiment, the formulaic relation may be obtained by taking several sample points in an environmental parameter versus operation parameter value (e.g., temperature versus optimal laser bias current) curve. Standard statistical curve fitting technology may then be used to fit a line or curve having particular characteristics (e.g., linear, polynomial, exponential, or the like) so as to reduce the sum of the squares of the error across all sample points. The microcode 301 may include instructions that perform this curve fitting after the appropriate number of sample points have been obtained.

A specific example in which the environmental parameter is temperature, and the operational parameter is laser bias current has been described. However, the principles of the present invention may apply to any measurable environmental parameter and operation parameter. For example, the environmental parameter may be, for example, supply voltage, humidity, acceleration, ambient light levels, ambient vibration, magnetic flux intensity, or any other environmental parameter that may affect the performance of an optical transceiver and that may be compensated for by suitable adjustment of an operational parameter. Furthermore, although a specific example of an operational parameter has been mentioned in the form of laser bias current, other operational parameters may be adjusted to compensate for the variations in environmental conditions. Such operational parameters may include, for example, a Thermo Electric Cooler (TEC) current.

An embodiment in which the microcode may be structured to calibrate one operational parameter to one environment parameter has been described. However, the principles of the present invention may be applied to microcode that calibrates multiple operational parameters (e.g., laser bias current and TEC current) to a single environmental parameter (e.g., temperature), or that calibrates a single operational parameter (e.g., laser bias current) to multiple environmental parameters (e.g., temperature and humidity), or that calibrates multiple operational parameters to multiple environmental parameters.

Accordingly, the principles of the present invention permit an optical transceiver to self-calibrate any set of one or more operational parameter to any set of one or more environmental parameter. Since this calibration is highly automated, the calibration may be accomplished with reduced operator labor, thereby reducing the cost to calibrate the optical transceiver. The principles of the present invention may also be applied to an optical receiver without an optical transmitter, or to an optical transmitter without an optical receiver. Accordingly, the principles of the present invention are not limited to the optical transceiver environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In an optical transceiver that includes at least one processor, a persistent memory and a system memory, the performance of the optical transceiver being sensitive to fluctuations in an environmental parameter, the optical transceiver including a sensor for sensing the environmental parameter, a method for the optical transceiver to self-calibrate to the operational parameter, the method comprising the following:
- an act of loading microcode from the persistent memory to the system memory;
- an act of executing the microcode using the at least one processor, wherein the microcode is structured such that the optical transceiver performs the following when executed by the at least one processor:
  - an act of sensing multiple values of an environmental parameter under environmental circumstances in which the environmental parameter changes;
  - based on the act of sensing, an act of approximating a function that relates the multiple values of the environmental parameter to multiple values of an operational parameter; and
  - an act of recording a representation of the approximated function in the persistent memory.

2. A method in accordance with claim 1, wherein the environmental parameter is temperature.

3. A method in accordance with claim 2, wherein the operational parameter is laser bias current.

4. A method in accordance with claim 2, wherein the operational parameter is Thermo Electric Cooler (TEC) current.

5. A method in accordance with claim 1, wherein the environmental parameter is supply voltage.

6. A method in accordance with claim 1, wherein the environmental parameter is humidity.

7. A method in accordance with claim 1, wherein the environmental parameter is acceleration.

8. A method in accordance with claim 1, wherein the environmental parameter is ambient light levels.

9. A method in accordance with claim 1, wherein the environmental parameter is ambient vibration.

10. A method in accordance with claim 1, wherein the environmental parameter is magnetic flux intensity.

11. A method in accordance with claim 1, wherein the representation of the approximation function comprises equation parameters.

12. A method in accordance with claim 1, wherein the representation of the approximation function comprises a table comparing the environmental parameter and the operational parameter.

13. A method in accordance with claim 1, wherein the persistent memory is an Electrically Erasable and Programmable Read-Only Memory (EEPROM).

14. An optical transceiver comprising the following:
- at least one processor;
- a system memory;
- a sensor for sensing an environmental parameter;
- a persistent memory, wherein the persistent memory contains microcode that, when executed by the at least one processor, causes the optical transceiver to sense the environmental parameter, approximate an independent variable to dependent variable function that relates how the operational parameter should change as a function of changes in the environmental parameter based on the sensing, and record a representation of the approximated function in the persistent memory.

15. An optical transceiver in accordance with claim 14, wherein the environmental parameter consists of one or more of temperature, supply voltage, humidity, acceleration, ambient light levels, ambient vibration, and magnetic flux intensity.

16. An optical transceiver in accordance with claim 14, wherein the operational parameter consists of one or more of laser bias current and TEC current.

17. An optical transceiver in accordance with claim 14, wherein the representation of the approximation function comprises equation parameters.

18. An optical transceiver in accordance with claim 14, wherein the representation of the approximation function comprises a table comparing the environmental parameter and the operational parameter.

19. An optical transceiver in accordance with claim 14, wherein the persistent memory is an Electrically Erasable and Programmable Read-Only Memory (EEPROM).

20. An optical transceiver in accordance with claim 14, wherein the optical transceiver is a 1G laser transceiver.

21. An optical transceiver in accordance with claim 14, wherein the optical transceiver is a 2G laser transceiver.

22. An optical transceiver in accordance with claim 14, wherein the optical transceiver is a 4G laser transceiver.

23. An optical transceiver in accordance with claim 14, wherein the optical transceiver is a 10G laser transceiver.

24. An optical transceiver in accordance with claim 14, wherein the optical transceiver is a laser transceiver suitable for fiber optic links greater than 10G.

25. An optical transceiver in accordance with claim 14, wherein the optical transceiver is an XFP laser transceiver.

26. An optical transceiver in accordance with claim 14, wherein the optical transceiver is an SFP laser transceiver.

27. An optical transceiver in accordance with claim 14, wherein the optical transceiver is a SFF laser transceiver.

28. An optical transmitter comprising the following:
- at least one processor;
- a system memory;
- a sensor for sensing an environmental parameter;
- a persistent memory, wherein the persistent memory contains microcode that, when executed by the at least one processor, causes the optical transmitter to sense the environmental parameter, approximate an independent variable to dependent variable function that relates how the operational parameter should change as a function of changes in the environmental parameter based on the sensing, and record a representation of the approximated function in the persistent memory.

29. An optical transmitter in accordance with claim 28, wherein the environmental parameter consists of one or more of temperature, supply voltage, humidity, acceleration, ambient light levels, ambient vibration, and magnetic flux intensity.

30. An optical transmitter in accordance with claim 28, wherein the operational parameter consists of one or more of laser bias current and TEC current.

31. An optical transmitter in accordance with claim 28, wherein the representation of the approximation function comprises equation parameters.

32. An optical transmitter in accordance with claim 28, wherein the representation of the approximation function comprises a table comparing the environmental parameter and the operational parameter.

33. An optical transmitter in accordance with claim 28, wherein the persistent memory is an Electrically Erasable and Programmable Read-Only Memory (EEPROM).

34. An optical receiver comprising the following:
- at least one processor;
- a system memory;
- a sensor for sensing an environmental parameter;
- a persistent memory, wherein the persistent memory contains microcode that, when executed by the at least one processor, causes the optical receiver to sense the environmental parameter, approximate an independent variable to dependent variable function that relates how the operational parameter should change as a function of changes in the environmental parameter based on the sensing, and record a representation of the approximated function in the persistent memory.

35. An optical receiver in accordance with claim 34, wherein the environmental parameter consists of one or more of temperature, supply voltage, humidity, acceleration, ambient light levels, ambient vibration, and magnetic flux intensity.

36. An optical receiver in accordance with claim 34, wherein the operational parameter consists of TEC current.

37. An optical receiver in accordance with claim 34, wherein the representation of the approximation function comprises equation parameters.

38. An optical receiver in accordance with claim 34, wherein the representation of the approximation function comprises a table comparing the environmental parameter and the operational parameter.

39. An optical receiver in accordance with claim 34, wherein the persistent memory is an Electrically Erasable and Programmable Read-Only Memory (EEPROM).

* * * * *

UNITED STATES PATENT AND TRADEMARK OFFICE
CERTIFICATE OF CORRECTION

Page 1 of 2

PATENT NO. : 7,509,050 B2
APPLICATION NO. : 10/882447
DATED : March 24, 2009
INVENTOR(S) : Ekkizogloy et al.

It is certified that error appears in the above-identified patent and that said Letters Patent is hereby corrected as shown below:

Drawings
Sheet 1, replace Figure 2 with the figure depicted below, wherein "Other Analog Components 202" has been changed to --Other Analog Components 215-- and "Input/Output Multiplier 208" has been changed to --Input/Output Multiplexer 208--

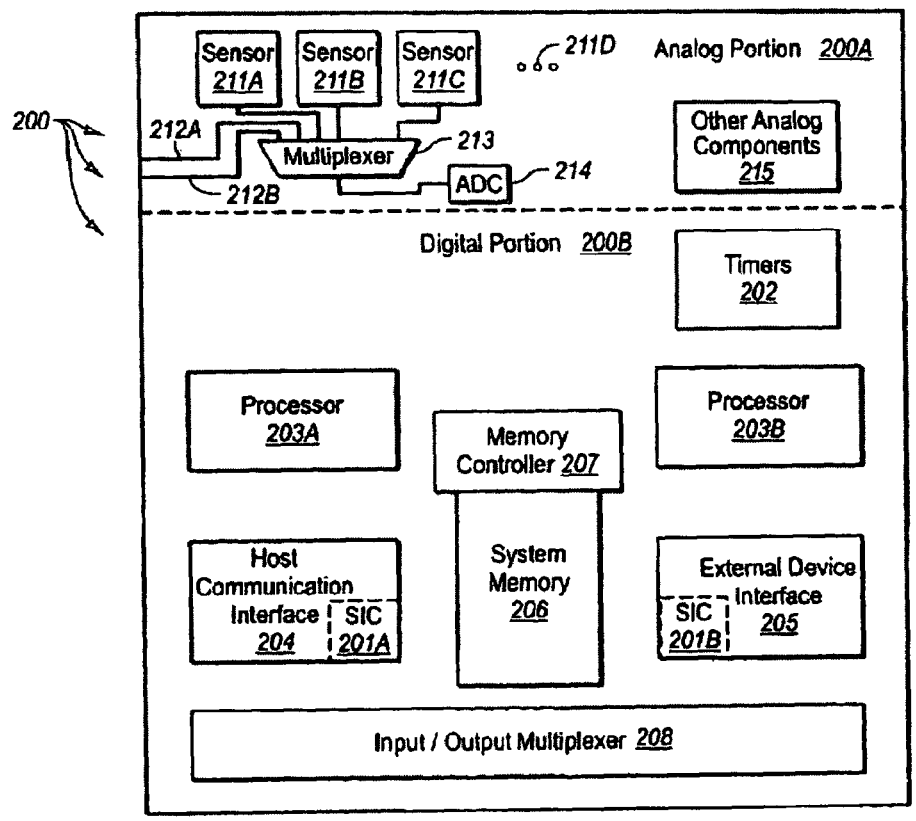

Fig. 2

Signed and Sealed this
Fifteenth Day of March, 2011

David J. Kappos
*Director of the United States Patent and Trademark Office*

Column 1
Line 49, after "operation of" insert --an--

Column 4
Line 22, change "laser transmitter/receiver 100" to --optical transceiver 100--
Line 30, change "other" to --on--

Column 5
Line 53, change "operation" to --operations--
Line 66, change "105" to --205--

Column 6
Line 43, change "persistent memory" to --persistent memory 106--
Line 44, change "system memory" to --system memory 206--
Line 46, change "system memory" to --system memory 206--

Column 8
Line 5, change "operation" to --operational--
Line 17, change "operation" to --operational--
Line 31, change "environment" to --environmental--
Line 43, change "parameter" to --parameters--
Line 44, change "parameter" to --parameters--